(12) United States Patent
Park et al.

(10) Patent No.: US 10,950,056 B2
(45) Date of Patent: Mar. 16, 2021

(54) APPARATUS AND METHOD FOR GENERATING POINT CLOUD DATA

(71) Applicant: MAXST CO., LTD., Seoul (KR)

(72) Inventors: Jae Wan Park, Ulsan (KR); Gi Seok Kwon, Gyeonggi-do (KR); Kyu Sung Cho, Sejong-si (KR); Seung Lee Kim, Seoul (KR)

(73) Assignee: MAXST CO., LTD., Seoul (KR)

( * ) Notice: Subject to any disclaimer, the term of this patent is extended or adjusted under 35 U.S.C. 154(b) by 0 days.

(21) Appl. No.: 16/524,384

(22) Filed: Jul. 29, 2019

(65) Prior Publication Data
US 2020/0357177 A1 Nov. 12, 2020

(30) Foreign Application Priority Data

May 7, 2019 (KR) .......................... 10-2019-0053219

(51) Int. Cl.
| | |
|---|---|
| *G06T 19/00* | (2011.01) |
| *G06T 7/73* | (2017.01) |
| *G06T 17/20* | (2006.01) |
| *G06T 19/20* | (2011.01) |

(52) U.S. Cl.
CPC .............. *G06T 19/006* (2013.01); *G06T 7/73* (2017.01); *G06T 17/20* (2013.01); *G06T 19/20* (2013.01); *G06T 2207/10028* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 2007/0252074 A1* | 11/2007 | Ng ..................... | G02B 27/0075 250/208.1 |
| 2019/0026948 A1* | 1/2019 | Kellogg ................. | G06T 7/73 |
| 2020/0117212 A1* | 4/2020 | Tian ..................... | G05D 1/0274 |

* cited by examiner

*Primary Examiner* — Frank S Chen
(74) *Attorney, Agent, or Firm* — The PL Law Group, PLLC

(57) ABSTRACT

According to the disclosed embodiments, virtualized information of a three-dimensional position for a position selected by the user is provided so that the user can place virtual content at an accurate position when authoring AR content. According to an embodiment, an apparatus for generating point cloud data includes a hardware processor to implement a feature point extractor to extract feature points from images obtained by capturing a three-dimensional region, a point cloud data generator to generate point cloud data related to the three-dimensional region on the basis of the extracted feature points, an overlay image display to display the generated point cloud data by overlaying the point cloud data on a currently captured image, and a three-dimensional position determiner to determine a three-dimensional position for a position selected by a user in the image.

12 Claims, 16 Drawing Sheets

APPARATUS AND METHOD FOR GENERATING POINT CLOUD DATA

CROSS-REFERENCE TO RELATED APPLICATION(S)

This application claims the benefit under 35 USC § 119(a) of Korean Patent Application No. 10-2019-0053219, filed on May 7, 2019, in the Korean Intellectual Property Office, the entire disclosure of which is incorporated herein by reference for all purposes.

BACKGROUND

1. Field

The following description relates to a technology for generating point cloud data related to a three-dimensional region.

2. Description of Related Art

Conventional augmented reality (AR) has widely used a method of recognizing a real-world object or a real-world space using a previously known marker or image and placing virtual content in the recognized object or space. In the case of AR using a marker or image, AR content developers can place virtual content on the basis of digitized texture on a mobile device or a personal computer (PC).

However, it is not easy to precisely place the virtual content in a three-dimensional object or a three-dimensional space. In order for an AR device to recognize a three-dimensional object or a three-dimensional space, a target to be recognized has to be learned using a simultaneous localization and mapping (SLAM) technique or a structure from motion (SFM) technique. In this case, the result of learning includes digitized point cloud. Point cloud refers to a collection of feature points having three-dimensional coordinate values which are obtained by extracting the feature points from an image taken by a camera and then assigning a depth value to each feature point through a triangulation method as the camera moves. Point cloud of a three-dimensional region including a three-dimensional object or a three-dimensional space vaguely defines the shape of the three-dimensional region, but does not accurately represent a position within the three-dimensional region corresponding to a specific position in the point cloud. Therefore, it is not easy for a content developer to place virtual content at a desired position in the digitized point cloud.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for generating point cloud data.

In one general aspect, an apparatus for generating point cloud data includes at least one hardware processor configured to implement a feature point extractor configured to extract a plurality of feature points from a plurality of images obtained by capturing a three-dimensional region; a point cloud data generator configured to generate point cloud data related to the three-dimensional region on the basis of the plurality of extracted feature points; an overlay image display configured to display the generated point cloud data by overlaying the point cloud data on a currently captured image of the three-dimensional region; and a three-dimensional position determiner configured to determine a three-dimensional position for a position selected by a user in the image on which the point cloud data is overlaid, wherein the overlay image display is configured to overlay and display visualized information of the determined three-dimensional position together with the point cloud data on the currently captured image.

The three-dimensional region may include at least one of a three-dimensional object and a three-dimensional space.

The three-dimensional position determiner may generate a three-dimensional ray connecting the selected position and a focal point of a camera lens capturing the three-dimensional region and determine the three-dimensional position using the three-dimensional ray.

The three-dimensional position determiner may determine a point with a shortest distance to the three-dimensional ray among a plurality of points included in the point cloud data as the three-dimensional position.

The three-dimensional position determiner may generate a mesh having a plurality of points included in the point cloud data as vertices and determine a point of contact between the three-dimensional ray and the mesh as the three-dimensional position.

The three-dimensional position determiner may project each of a plurality of points included in the point cloud data onto the image on which the point cloud data is overlaid and determine a point with the shortest distance to the selected position among the plurality of projected points as the three-dimensional position.

When a plurality of positions are selected, the overlay image display may display information obtained by visualizing a three-dimensional position for each of the plurality of selected positions with a different color.

The overlay image display may display the visualized information together with information input by the user regarding the selected position.

In another general aspect, a method of generating point cloud data includes extracting a plurality of feature points from a plurality of images obtained by capturing a three-dimensional region; generating point cloud data related to the three-dimensional region on the basis of the plurality of extracted feature points; displaying the generated point cloud data by overlaying the point cloud data on a currently captured image of the three-dimensional region; determining a three-dimensional position for a position selected by a user in the image on which the point cloud data is overlaid; and overlaying and displaying visualized information of the determined three-dimensional position together with the point cloud data on the currently captured image.

The three-dimensional region may include at least one of a three-dimensional object and a three-dimensional space.

The determining of the three-dimensional position may include generating a three-dimensional ray connecting the selected position and a focal point of a camera lens capturing the three-dimensional region and determining the three-dimensional position using the three-dimensional ray.

The determining of the three-dimensional position may include determining a point with a shortest distance to the three-dimensional ray among a plurality of points included in the point cloud data as the three-dimensional position.

The determining of the three-dimensional position may include generating a mesh having a plurality of points included in the point cloud data as vertices and determining a point of contact between the three-dimensional ray and the mesh as the three-dimensional position.

The determining of the three-dimensional position may include projecting each of a plurality of points included in the point cloud data onto the image on which the point cloud data is overlaid and determining a point with the shortest distance to the selected position among the plurality of projected points as the three-dimensional position.

The overlaying and displaying of the visualized information together with the point cloud data on the currently captured image may include, when a plurality of positions are selected, displaying information obtained by visualizing a three-dimensional position for each of the plurality of selected positions with a different color.

The overlaying and displaying of the visualized information together with the point cloud data on the currently captured image may include displaying the visualized information together with information input by the user regarding the selected position.

Other features and aspects will be apparent from the following detailed description, the drawings, and the claims.

Figure 1:
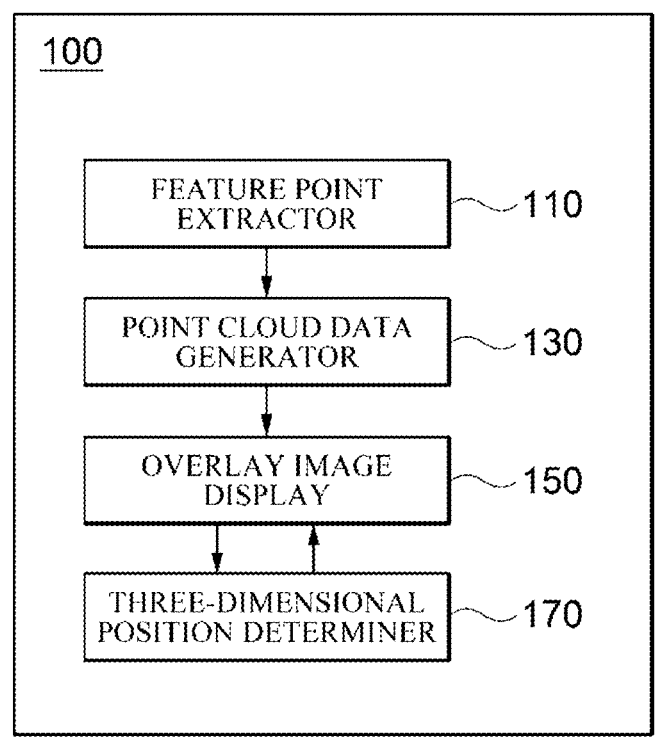
FIG. 1 is a diagram illustrating a configuration of an apparatus for generating point cloud data.
Figure 2A:
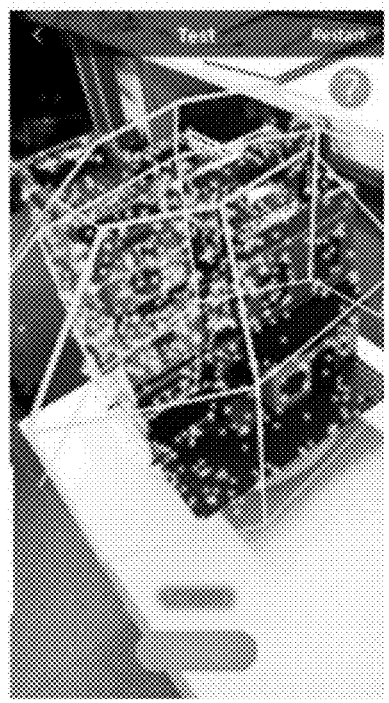
FIGS. 2A to 2D are diagrams illustrating an example of point cloud data related to a three-dimensional region according to one embodiment.
Figure 2B:
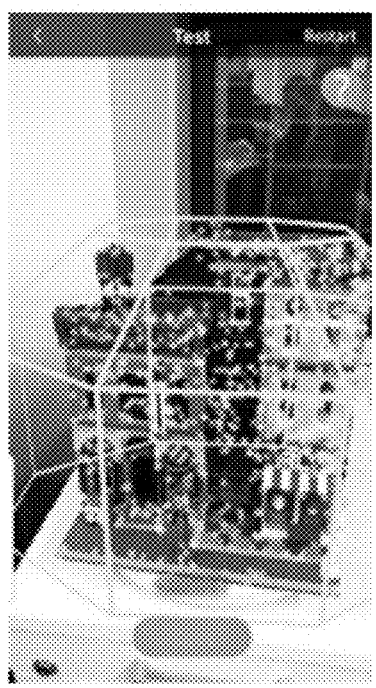
Figure 2C:
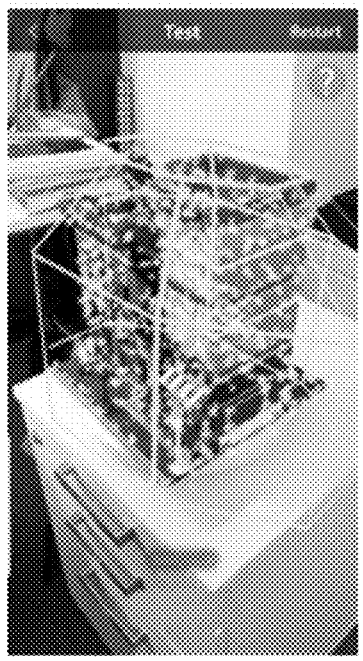
Figure 2D:
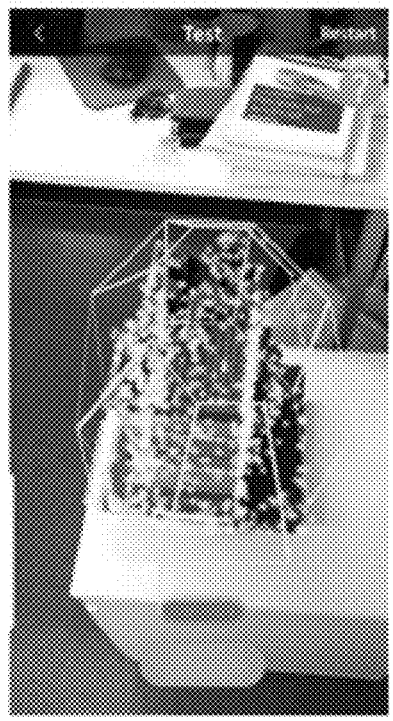

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of an apparatus 100 for generating point cloud data.

Referring to FIG. 1, the apparatus 100 for generating point cloud data includes a feature point extractor 110, a point cloud data generator 130, an overlay image display 150, and a three-dimensional position determiner 170.

Meanwhile, in one embodiment, the feature point extractor 110, the point cloud data generator 130, the overlay image display 150 and the three-dimensional position determiner 170 may be implemented using one or more physically separate devices, or may be implemented by one or more hardware processors, or may be implemented by a combination of one or more hardware processors and software, and may not be clearly distinguished in the concrete operation unlike the illustrated embodiment.

The apparatus 100 for generating point cloud data displays visualized information of a three-dimensional position for a position selected by a user in an image obtained by capturing a 3-dimensional region, along with point cloud data and a currently captured image, thereby allowing for identification of a position for authoring augmented reality (AR) content. The apparatus 100 for generating point cloud data may be embodied as various types of devices that can be worn or carried by the user, such as a wearable device and a mobile device, or embodied as one configuration included in such a device, wherein examples of the wearable device may include a head mounted display (HMD), smart glass, and the like and examples of the mobile device may include a smartphone, a tablet, a tablet PC, a PDA, and the like. In addition, the apparatus 100 for generating point cloud data may be embodied as various types of unmanned vehicles, such as a robot, a drone, a self-driving vehicle, and the like, or embodied as one configuration included in the unmanned vehicle.

The feature point extractor 110 extracts a plurality of feature points from a plurality of images obtained by capturing a three-dimensional region.

In this case, according to one embodiment, the three-dimensional region may include at least one of a three-dimensional object and a three-dimensional space. For example, the three-dimensional region may include various forms of three-dimensional objects, such as objects including a desk, a chair, a telephone, and the like, or a person, and also include various forms of three-dimensional spaces that are occupied by objects or persons, such as an indoor space, such as inside of a house, inside of a shopping mall, inside of an airport, and the like, and an outdoor space, such as a street, an outdoor park, and the like.

The plurality of images may be generated by photographing the three-dimensional region through a photographing unit, such as a camera. For example, the plurality of images may be images obtained by continuously photographing the three-dimensional region while changing a photographing position.

In addition, in order to extract the feature points, various known algorithms, such as scale-invariant feature transform (SIFT), speeded up robust features (SURF), features from accelerated segment test (FAST), Harris-Corner detector, and the like, may be used.

The point cloud data generator 130 generates point cloud data related to the three-dimensional region on the basis of the plurality of extracted feature points. In this case, the generation of point cloud data for the three-dimensional region may be performed using, for example, a simultaneous localization and mapping (SLAM) technique or a structure from motion (SFM) technique.

The point cloud data display 150 displays the generated point cloud data by overlaying the same on a currently captured image of the three-dimensional region. In this case, the point cloud data display 150 may display the point cloud data through an output unit, such as a monitor, a display device, or the like, by overlaying the point cloud data on the currently captured image.

Specifically, FIGS. 2A to 2D are diagrams illustrating an example of point cloud data related to a three-dimensional region according to one embodiment. In FIGS. 2A to 2D show currently captured images of the three-dimensional region photographed according to various photographing positions.

Referring to FIGS. 2A to 2D, the point cloud data generated by the point cloud data generator 130 may be overlaid on the currently captured image of the three-dimensional region. The point cloud data overlaid on the currently captured image may be displayed together with the currently captured image.

Meanwhile, the three-dimensional position determiner 170 determines a three-dimensional position for a position selected by the user in the image on which the point cloud data is overlaid.

Specifically, the three-dimensional position determiner 170 may receive, from the user, one or more positions at which virtual content is to be placed. For example, the user may select, through an input unit, such as a touch screen, a mouse, or the like, one or more positions at which the virtual content is to be placed from the image on which the point cloud data is overlaid.

Figure 3:
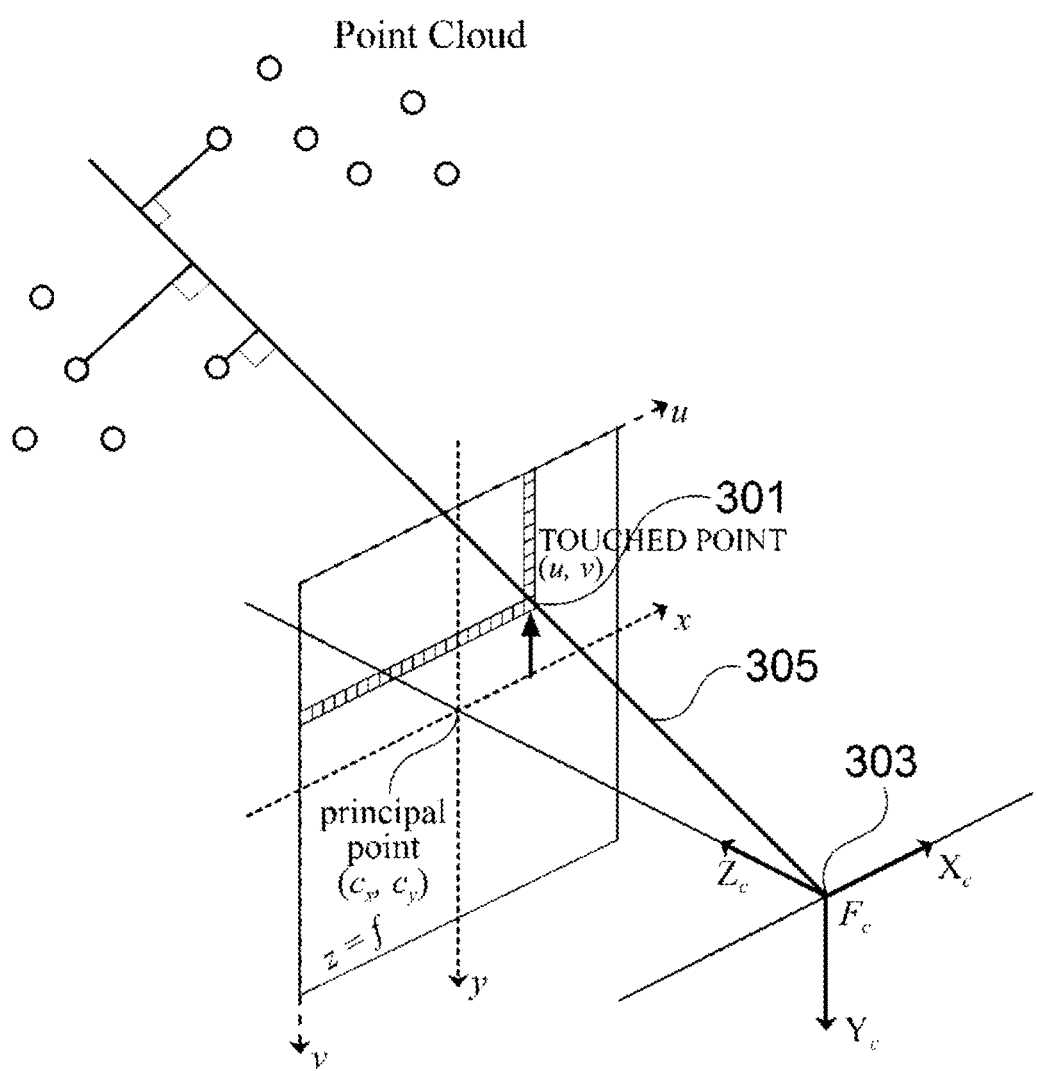
FIG. 3 is a diagram for describing an example in which a three-dimensional position is determined according to one embodiment.

FIG. 3 is a diagram for describing an example in which a three-dimensional position is determined according to one embodiment.

Referring to FIG. 3, the three-dimensional position determiner 170 may generate a three-dimensional ray 305 connecting a position 301 selected by the user and a focal point 303 of a camera lens that captures a three-dimensional region and determine a three-dimensional position using the three-dimensional ray. In this case, the three-dimensional ray may refer to a line straightly extending from the focal point of the camera lens through the position selected by the user.

Specifically, the three-dimensional position determiner 170 may generate the three-dimensional ray 305 on the basis of two-dimensional coordinates of a point corresponding to the position selected by the user in an image plane of the three-dimensional space that corresponds to the currently captured image and three-dimensional coordinates of the focal point of the camera lens that captures the three-dimensional region.

Then, the three-dimensional position determiner 170 may determine a point with the shortest distance to the three-dimensional ray 305 among a plurality of points included in the point cloud data as a three-dimensional position. Specifically, the three-dimensional position determiner 170 may calculate distances between the three-dimensional ray and three-dimensional coordinates of each of the plurality of points and determine a point with the calculated shortest distance among the plurality of points as the three-dimensional position for the position selected by the user.

Figure 4:
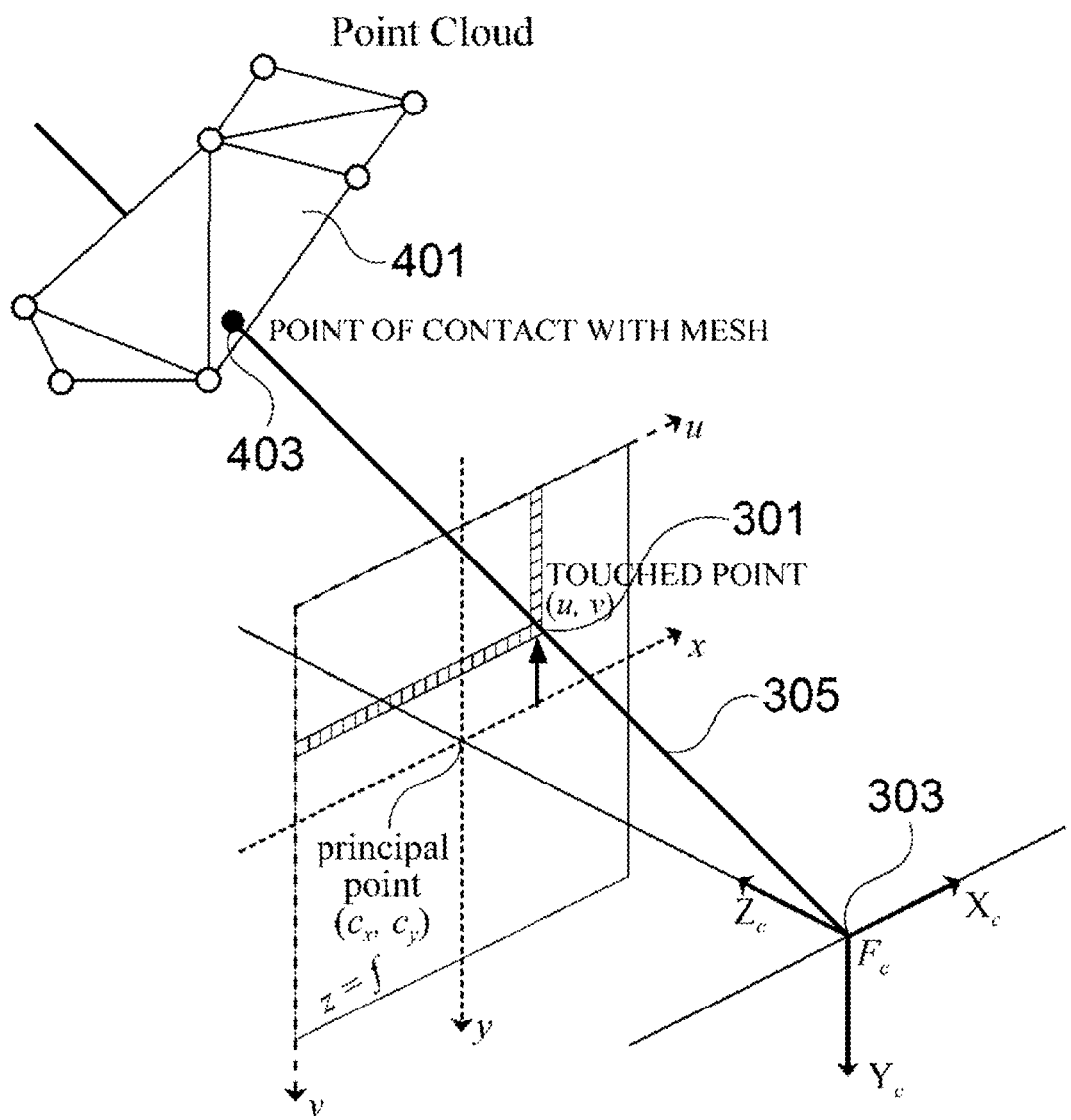
FIG. 4 is a diagram for describing another example in which a three-dimensional position is determined according to one embodiment.

FIG. 4 is a diagram for describing another example in which a three-dimensional position is determined according to one embodiment.

Referring to FIG. 4, the three-dimensional position determiner 170 may generate a three-dimensional ray 305 connecting a position 301 selected by the user and a focal point 303 of a camera lens that captures a three-dimensional region.

In addition, the three-dimensional position determiner 170 may generate a mesh 401 having a plurality of points included in point cloud data as vertices. Specifically, the three-dimensional position determiner 170 may generate a polygonal-shaped mesh 401 by connecting adjacent points among the plurality of points. In this case, the mesh may be, for example, a polygon mesh consisting of polygons.

Then, the three-dimensional position determiner 170 may determine a point 403 of contact between the three-dimensional ray 305 and the mesh 401 as a three-dimensional position. Specifically, the three-dimensional position determiner 170 may determine the point 403 at which the three-dimensional ray 305 and a surface of the mesh 401 meet as the three-dimensional position for the position selected by the user.

Figure 5:
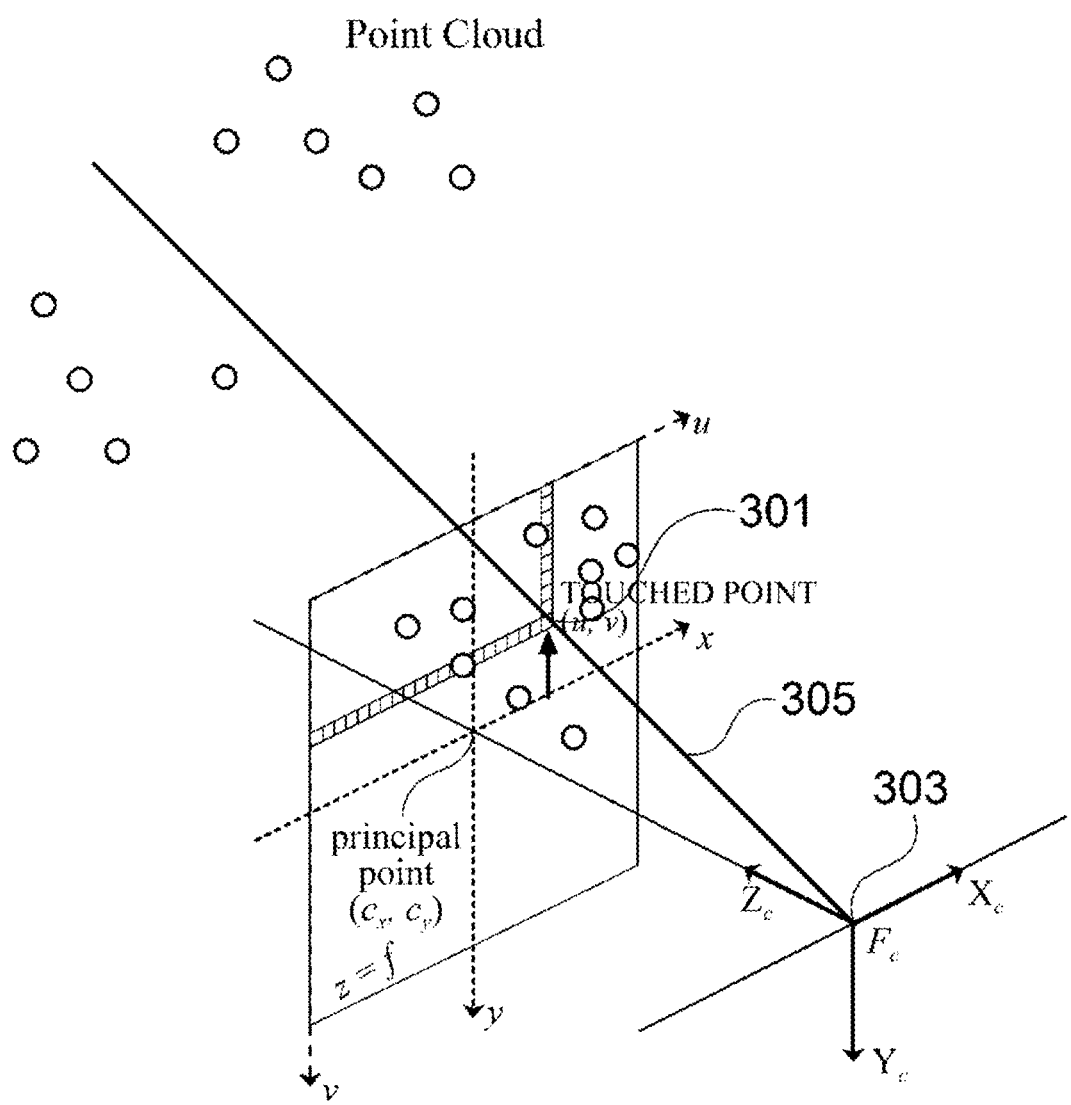
FIG. 5 is a diagram for describing still another example in which a three-dimensional position is determined according to one embodiment.
Figure 6A:
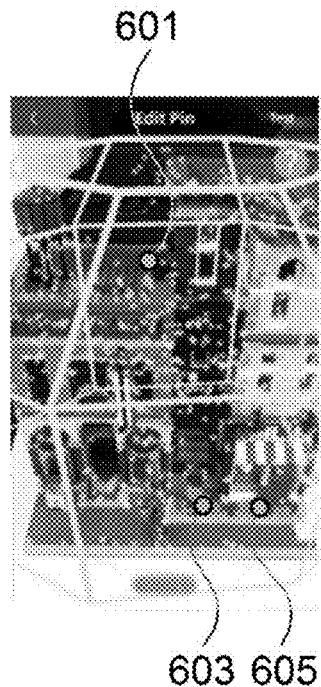
FIGS. 6A to 6D are diagrams illustrating an example in which visualized information of a three-dimensional position according to one embodiment.
Figure 6B:
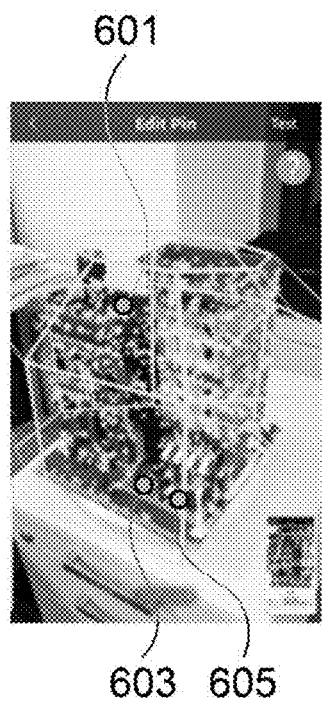
Figure 6C:
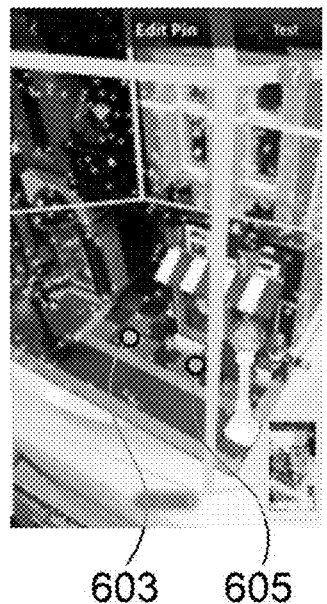
Figure 6D:
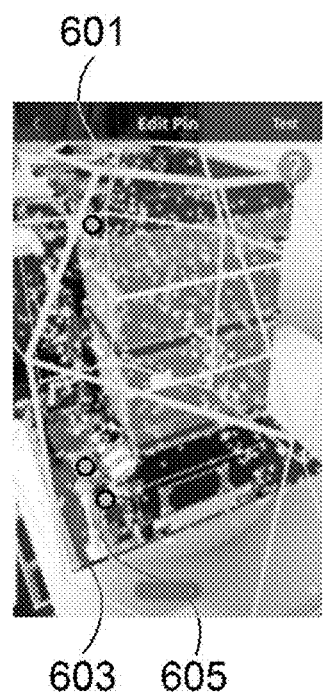

FIG. 5 is a diagram for describing still another example in which a three-dimensional position is determined according to one embodiment.

Referring to FIG. 5, the three-dimensional position determiner 170 may project each of a plurality of points included in point cloud data onto an image on which the point cloud data is overlaid. In addition, the three-dimensional position determiner 170 may determine a point with the shortest distance to a selected position 301 among the plurality of projected points as a three-dimensional position. Specifically, the three-dimensional position determiner 170 may calculate distances between 2-dimensional coordinates of each of the plurality of projected points and second-dimensional coordinates of the selected position 301 and determine a point with the calculated shortest distance among the plurality of points as a three-dimensional position for the position 301 selected by the user.

Meanwhile, the overlay image display 150 displays visualized information of the determined three-dimensional position by overlaying the visualized information together with the point cloud data on the currently captured image.

FIGS. 6A to 6D are diagrams illustrating an example in which visualized information of a three-dimensional position according to one embodiment. In FIGS. 6A to 6D show currently captured images of a three-dimensional region photographed according to various photographing positions.

Referring to FIGS. 6A to 6D, the overlay image display 150 may display virtual pins 601, 603, and 605 obtained by visualizing three-dimensional positions, together with an image overlaid with point cloud data by overlaying the virtual pins 601, 603, and 605 on the image. In this case, when a plurality of positions are selected by the user, the overlay image display 150 may display the virtual pins 601, 603, and 605 at a three-dimensional position for each of the plurality of positions.

Figure 7:
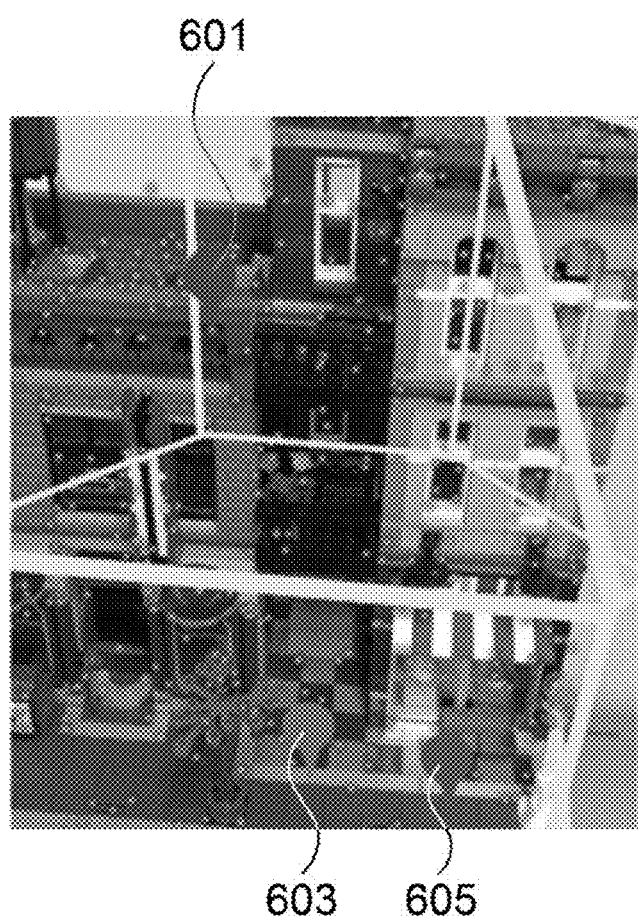
FIG. 7 is a diagram illustrating another example in which visualized information of a three-dimensional position according to one embodiment.

FIG. 7 is a diagram illustrating another example in which visualized information of a three-dimensional position according to one embodiment.

Referring to FIG. 7, when a plurality of positions are selected, the overlay image display 150 may display information obtained by visualizing a three-dimensional position for each of the plurality of selected positions with a different color. For example, the overlay image display 150 may change a color of a virtual pin, which is obtained by visualizing the three-dimensional position for each of the plurality of selected positions, on the basis of color information input by the user. Then, the overlay image display 150 may overlay and display the plurality of virtual pins 601, 603, and 605, which are obtained by visualizing the three-dimensional positions in different colors, together with point cloud data on a currently captured image.

Meanwhile, in the above-described example, as an example of the visualized information of the three-dimensional position, the color of visualized information may be set by the user, but the embodiment is not limited thereto, such that the shape, form, size, and the like of the visualized information of the three-dimensional position may be variously set by the user.

Figure 8:
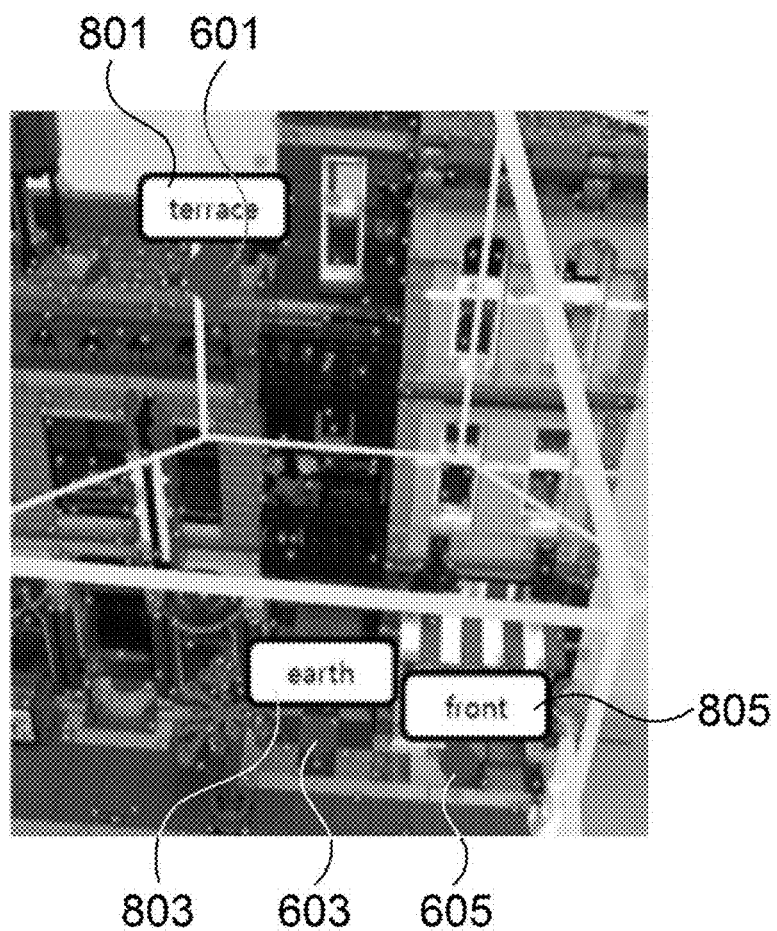
FIG. 8 is a diagram illustrating still another example in which visualized information of a three-dimensional position is displayed according to one embodiment.

FIG. 8 is a diagram illustrating still another example in which visualized information of a three-dimensional position is displayed according to one embodiment.

Referring to FIG. 8, the overlay image display 150 may display information input by the user related to a selected position together with visualized information of a three-dimensional position. Specifically, the overlay image display 150 may receive, from the user, information related to a position selected by the user. For example, the user may input text for describing a selected position. Then, the overlay image display 150 may generate the input information in the form of word balloons 801, 803, and 805 and display the generated word balloons 801, 803, and 805 together with virtual pins 601, 603, and 605 on an image overlaid with point cloud data.

Meanwhile, as described in the examples shown in FIGS. 7 and 8, even when the user selects a plurality of positions in the image overlaid with the point cloud data, the user may be separately provided with visualized information of a three-dimensional position of each of the plurality of selected positions. Thus, the apparatus 100 for generating point cloud data may distinguishably display each piece of the visualized information of the three-dimensional positions, thereby allowing the user to place virtual content at an accurate position when authoring AR content.

In addition, according to one embodiment, the overlay image display 150 may remove or change the visualized information of the three-dimensional position, on the basis of a control command of the user.

Specifically, the user may input a command for removing or changing the visualized information of the three-dimensional position. For example, when the user selects the visualized information of the three-dimensional position from the image overlaid with the visualized information, the overlay image display 150 may provide the user with a graphic user interface for removing or changing the visualized information of the three-dimensional position. In this case, the user may input the command for removing or changing the visualized information of the three-dimensional position through the provided graphic user interface.

In another example, the user may input a command for removing or changing the visualized information of the three-dimensional position through a preset input method, such as double clicking the visualized information of the three-dimensional position, selecting the visualized information for a predetermined period of time or longer, dragging the visualized information, or the like.

Figure 9:
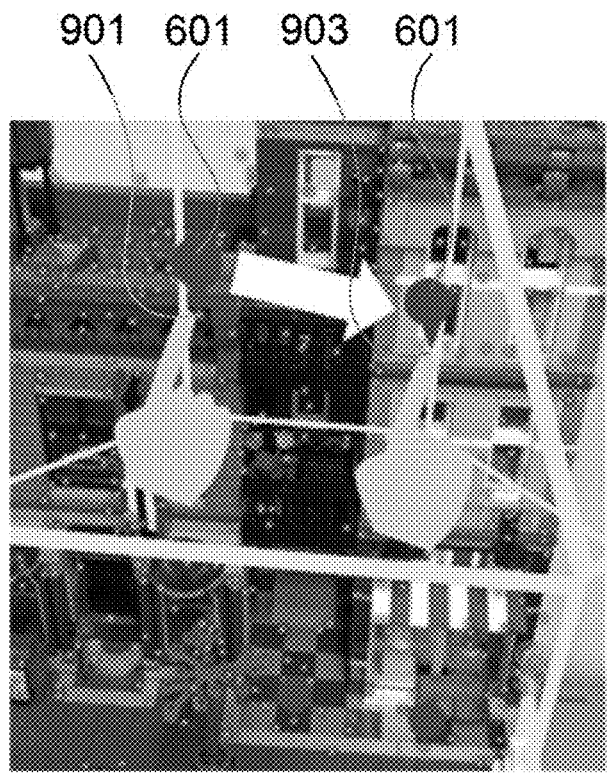
FIG. 9 is a diagram for describing an example in which visualized information of a three-dimensional position is changed according to one embodiment.

FIG. 9 is a diagram for describing an example in which visualized information of a three-dimensional position is changed according to one embodiment.

Referring to FIG. 9, the user may move a position of the visualized information of the three-dimensional position by inputting a drag command. Specifically, the user may input a drag command for moving a virtual pin 601 obtained by visualizing the three-dimensional position to another position. The overlay image display 150 may move and display the virtual pin 601 from the existing position 901 to another position 903 desired by the user according to the drag command input by the user.

Figure 10A:
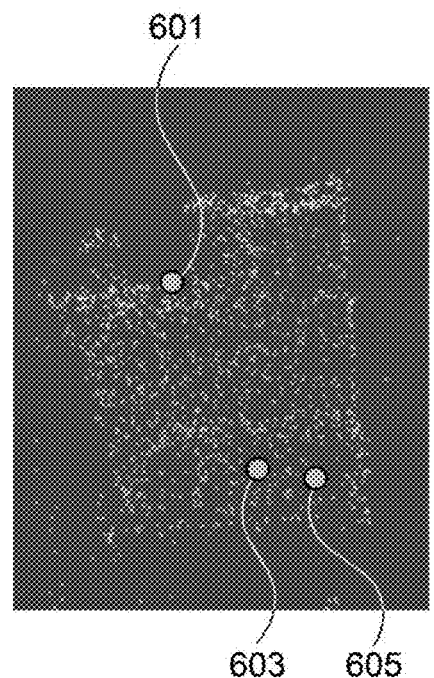
FIGS. 10A and 10B are diagrams illustrating an example of point cloud data and virtualized information of three-dimensional positions which are displayed at the time of placing virtual content according to one embodiment.
Figure 10B:
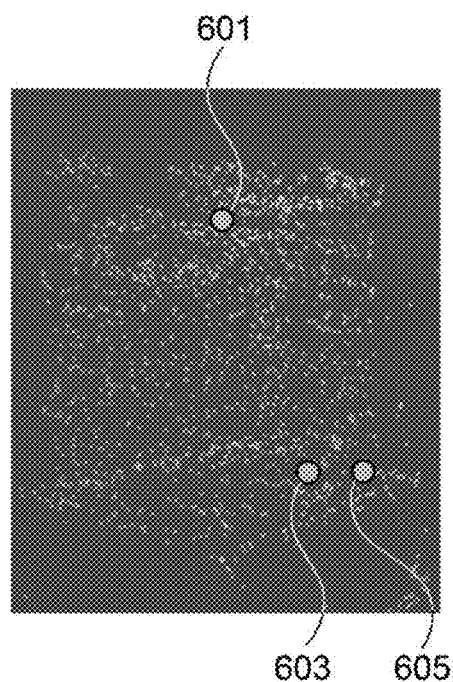

FIGS. 10A and 10B are diagrams illustrating an example of point cloud data and virtualized information of three-dimensional positions which are displayed at the time of placing virtual content according to one embodiment. In FIGS. 10A and 10B show point cloud data and virtualized information of three-dimensional positions which are displayed at various angles.

Referring to FIGS. 10A and 10B, it can be seen that point cloud data for a three-dimensional region and virtual pins 601, 603, and 605 which are information obtained by virtualizing three-dimensional positions for positions selected by a user are displayed together when virtual content is authored.

Figure 11:
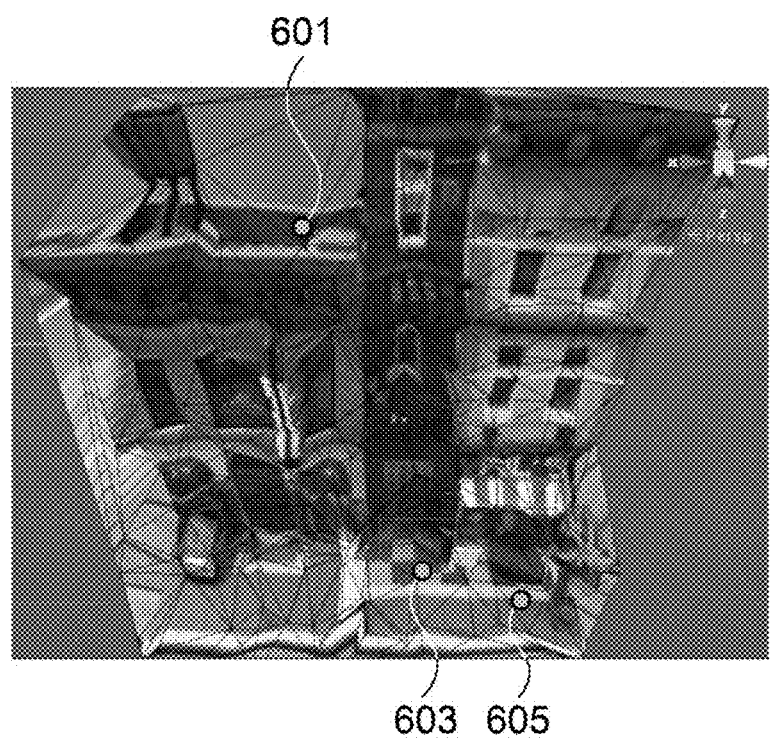
FIG. 11 is a diagram illustrating another example of point cloud data and virtualized information of three-dimensional positions which are displayed at the time of placing virtual content according to one embodiment.

FIG. 11 is a diagram illustrating another example of point cloud data and virtualized information of three-dimensional positions which are displayed at the time of placing virtual content according to one embodiment.

Referring to FIG. 11, it can be seen that a mesh for a three-dimensional region generated using point cloud data and virtual pins 601, 603, and 605 which are information obtained by virtualizing three-dimensional positions for positions selected by a user are displayed together when virtual content is authored.

Figure 12:
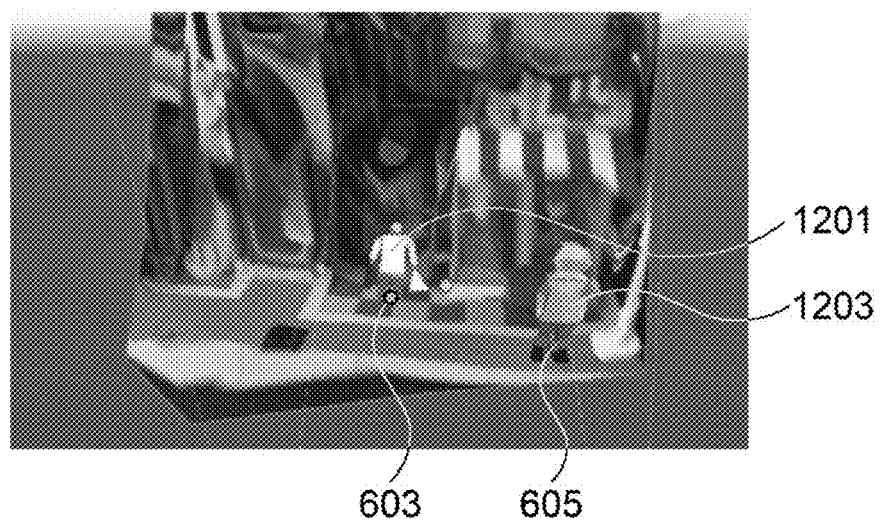
FIG. 12 is a diagram illustrating an example in which virtual content is placed on the basis of virtualized information of three-dimensional positions according to one embodiment.

FIG. 12 is a diagram illustrating an example in which virtual content is placed on the basis of virtualized information of three-dimensional positions according to one embodiment.

Referring to FIG. 12, it can be seen that a user accurately places virtual contents 1201 and 1203 at desired positions on the basis of virtualized information 603 and 605 of three-dimensional positions.

Figure 13:
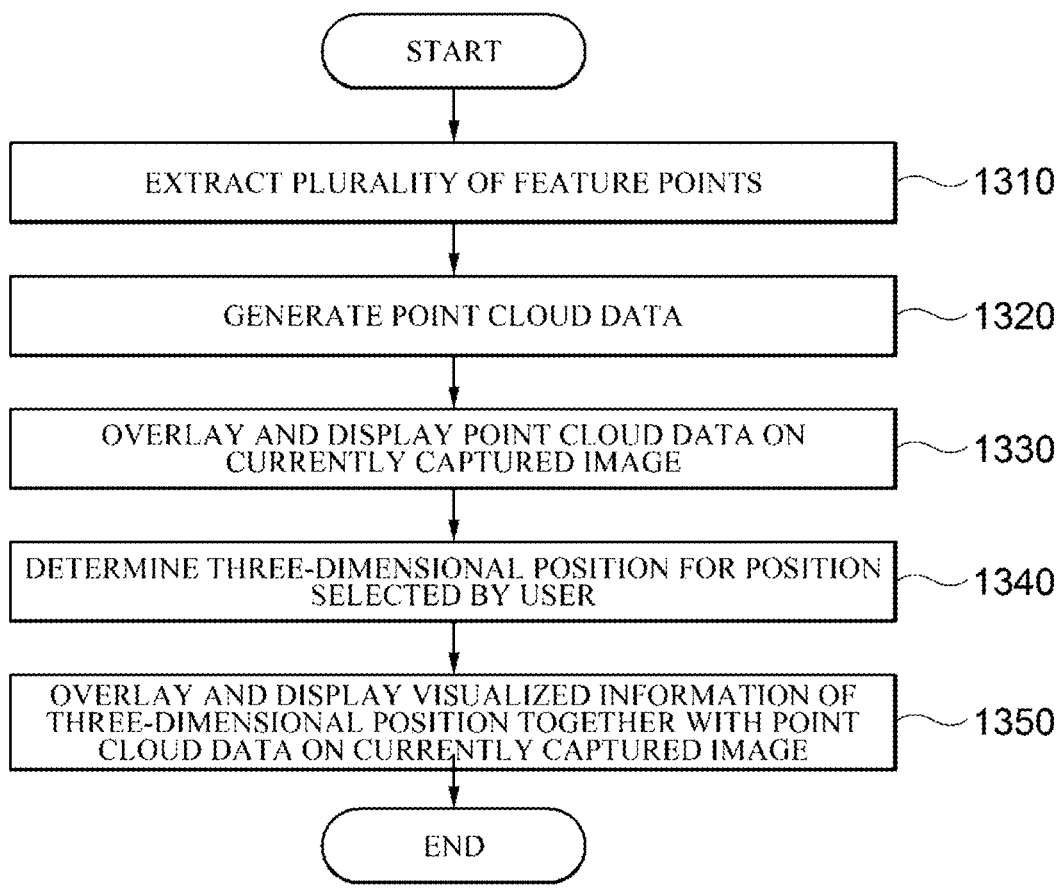
FIG. 13 is a flowchart illustrating a method of generating point cloud data according to one embodiment.

FIG. 13 is a flowchart illustrating a method of generating point cloud data according to one embodiment.

The method shown in FIG. 13 may be performed by, for example, the apparatus 100 of FIG. 1 to generate point cloud data.

Referring to FIG. 13, the apparatus 100 extracts a plurality of feature points from a plurality of captured images of a three-dimensional region (1310).

Then, the apparatus 100 generates point cloud data for a three-dimensional region on the basis of the plurality of extracted feature points (1320).

Then, the apparatus 100 displays the generated point cloud data by overlaying the point cloud data on a currently captured image of the three-dimensional region (1330).

Then, the apparatus 100 determines a three-dimensional position for a position selected by the user in the image overlaid with the point cloud data (1340).

Then, the apparatus 100 displays virtualized information of the determined three-dimensional position by overlaying the virtualized information together with the point cloud data on the currently captured image (1350).

In this case, when a plurality of positions are selected, the apparatus 100 may display information obtained by virtualizing a three-dimensional position for each of the plurality of selected positions with a different color.

In addition, the apparatus 100 may display the virtualized information together with information input by the user regarding the selected position.

Figure 14:
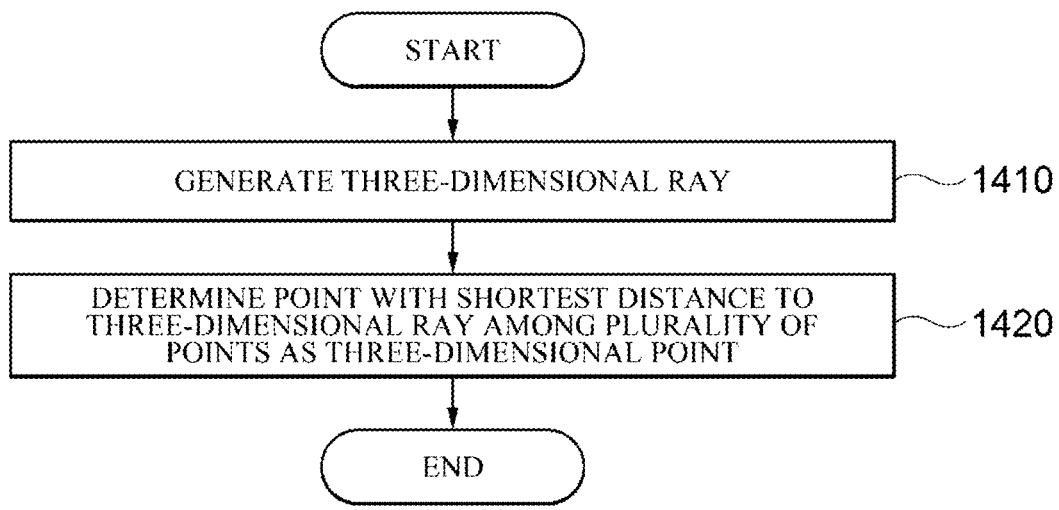
FIG. 14 is a flowchart illustrating a method of determining a three-dimensional position according to one embodiment.

FIG. 14 is a flowchart illustrating a method of determining a three-dimensional position according to one embodiment.

The method shown in FIG. 14 may be performed by, for example, the apparatus 100 of FIG. 1 to generate point cloud data.

Referring to FIG. 14, the apparatus 100 may generate a three-dimensional ray connecting a position selected by a user and a focal point of a camera lens capturing a three-dimensional region (1410).

Then, the apparatus 100 may determine a point with the shortest distance to the three-dimensional ray among a plurality of points included in point cloud data as a three-dimensional position (1420).

Figure 15:
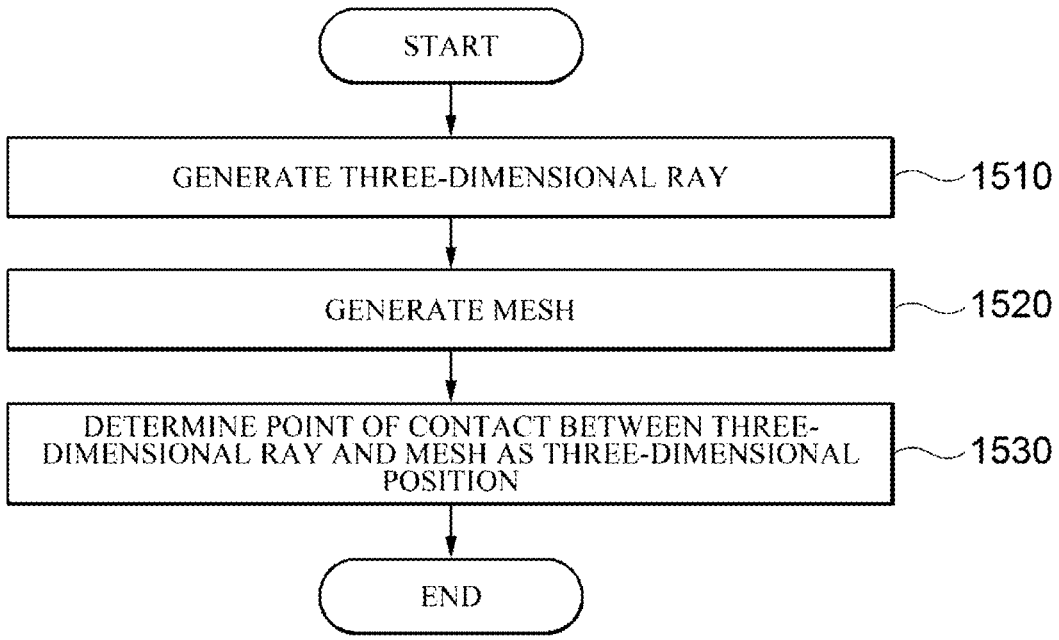
FIG. 15 is a flowchart illustrating another method of determining a three-dimensional position according to one embodiment.

FIG. 15 is a flowchart illustrating another method of determining a three-dimensional position according to one embodiment.

The method shown in FIG. 15 may be performed by, for example, the apparatus 100 of FIG. 1 to generate point cloud data.

Referring to FIG. 15, the apparatus 100 may generate a three-dimensional ray connecting a position selected by a user and the center of the camera capturing a three-dimensional region (1510).

Then, the apparatus 100 may generate a mesh having a plurality of points included in point cloud data as vertices (1520).

The apparatus 100 may determine a point of contact between the three-dimensional ray and the mesh as a three-dimensional position (1530).

Figure 16:
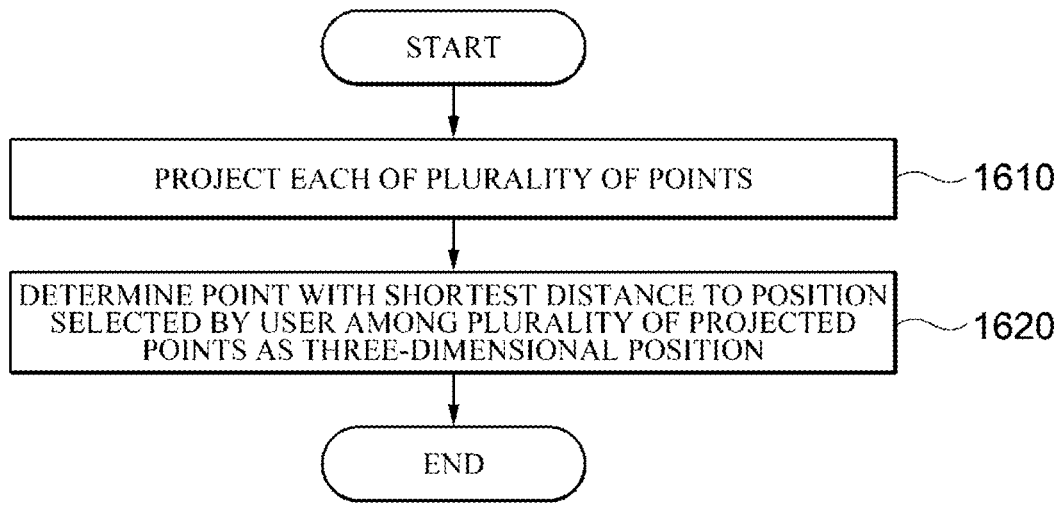
FIG. 16 is a flowchart illustrating still another method of determining a three-dimensional position according to one embodiment.

FIG. 16 is a flowchart illustrating still another method of determining a three-dimensional position according to one embodiment.

The method shown in FIG. 16 may be performed by, for example, the apparatus 100 of FIG. 1 to generate point cloud data.

Referring to FIG. 16, the apparatus 100 may project each of a plurality of points included in point cloud data onto an image overlaid with the point cloud data (1610).

Then, the apparatus 100 may determine a point with the shortest distance to a selected point among the plurality of projected points as a three-dimensional position (1620).

In the flowcharts illustrated in FIGS. 13 to 16, one process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 17:
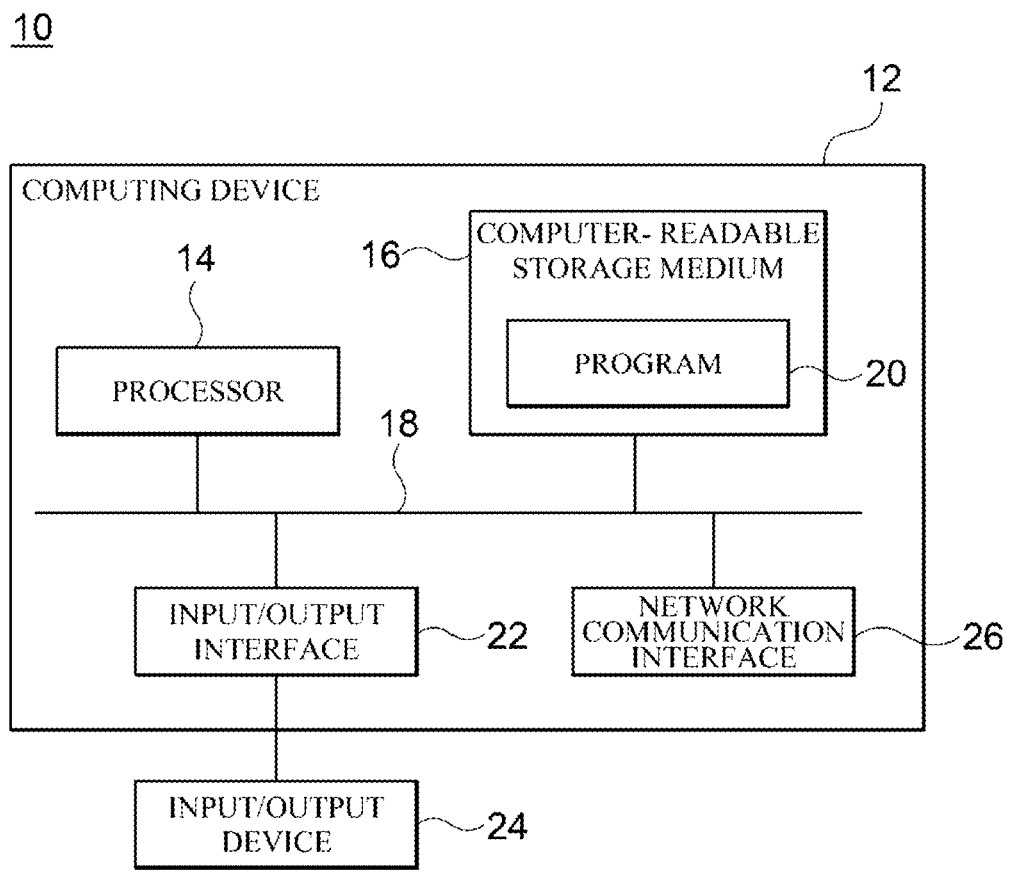
FIG. 17 is a block diagram for describing a computing environment including a computing device suitable to be used in exemplary embodiments.

FIG. 17 is a block diagram for describing a computing environment including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the apparatus 100 illustrated in FIG. 1 to generate point cloud data.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, virtualized information of a three-dimensional position for a position selected by the user is provided, so that the user can place virtual content at an accurate position when authoring AR content.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating point cloud data, comprising at least one hardware processor configured to implement:
   a feature point extractor configured to extract a plurality of feature points from a plurality of images obtained by capturing a three-dimensional region;
   a point cloud data generator configured to generate point cloud data related to the three-dimensional region on the basis of the plurality of extracted feature points;
   an overlay image display configured to display the generated point cloud data by overlaying the point cloud data on a currently captured image of the three-dimensional region; and
   a three-dimensional position determiner configured to determine a three-dimensional position for a position selected by a user in the image on which the point cloud data is overlaid,
   wherein the overlay image display is configured to overlay and display visualized information of the determined three-dimensional position together with the point cloud data on the currently captured image; and
   the three-dimensional position determiner is further configured to generate a three-dimensional ray connecting the selected position and a focal point of a camera lens capturing the three-dimensional region and determine a point with a shortest distance to the three-dimensional ray among a plurality of points included in the point cloud data as the three-dimensional position.

2. The apparatus of claim 1, wherein the three-dimensional region comprises at least one of a three-dimensional object and a three-dimensional space.

3. The apparatus of claim 1, wherein the three-dimensional position determiner is further configured to generate a mesh having a plurality of points included in the point cloud data as vertices and determine a point of contact between the three-dimensional ray and the mesh as the three-dimensional position.

4. The apparatus of claim 1, wherein the three-dimensional position determiner is further configured to project each of a plurality of points included in the point cloud data onto the image on which the point cloud data is overlaid and determine a point with the shortest distance to the selected position among the plurality of projected points as the three-dimensional position.

5. The apparatus of claim 1, wherein when a plurality of positions are selected, the overlay image display is further configured to display information obtained by visualizing a three-dimensional position for each of the plurality of selected positions with a different color.

6. The apparatus of claim 1, wherein the overlay image display is further configured to display the visualized information together with information input by the user regarding the selected position.

7. A method of generating point cloud data, comprising:
   extracting a plurality of feature points from a plurality of images obtained by capturing a three-dimensional region;
   generating point cloud data related to the three-dimensional region on the basis of the plurality of extracted feature points;
   displaying the generated point cloud data by overlaying the point cloud data on a currently captured image of the three-dimensional region;
   determining a three-dimensional position for a position selected by a user in the image on which the point cloud data is overlaid; and
   overlaying and displaying visualized information of the determined three-dimensional position together with the point cloud data on the currently captured image,
   wherein the determining of the three-dimensional position comprises generating a three-dimensional ray connecting the selected position and a focal point of a camera lens capturing the three-dimensional region and determining a point with a shortest distance to the three-dimensional ray among a plurality of points included in the point cloud data as the three-dimensional position.

8. The method of claim 7, wherein the three-dimensional region comprises at least one of a three-dimensional object and a three-dimensional space.

9. The method of claim 7, wherein the determining of the three-dimensional position comprises generating a mesh having a plurality of points included in the point cloud data as vertices and determining a point of contact between the three-dimensional ray and the mesh as the three-dimensional position.

10. The method of claim 7, wherein the determining of the three-dimensional position comprises projecting each of a plurality of points included in the point cloud data onto the image on which the point cloud data is overlaid and determining a point with the shortest distance to the selected position among the plurality of projected points as the three-dimensional position.

11. The method of claim 7, wherein the overlaying and displaying of the visualized information together with the point cloud data on the currently captured image comprises, when a plurality of positions are selected, displaying information obtained by visualizing a three-dimensional position for each of the plurality of selected positions with a different color.

12. The method of claim 7, wherein the overlaying and displaying of the visualized information together with the point cloud data on the currently captured image comprises displaying the visualized information together with information input by the user regarding the selected position.

* * * * *